(12) United States Patent
Yang et al.

(10) Patent No.: US 8,340,593 B2
(45) Date of Patent: Dec. 25, 2012

(54) TECHNIQUES TO CONTROL UPLINK POWER

(75) Inventors: Rongzhen Yang, Shanghai (CN); Apostolos Papathanassiou, San Jose, CA (US); Hujun Yin, Saratoga, CA (US); Yang-seok Choi, Portland, OR (US); Wei Guan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 12/590,546

(22) Filed: Nov. 10, 2009

(65) Prior Publication Data

US 2011/0111766 A1 May 12, 2011

(51) Int. Cl.
*H04B 1/00* (2006.01)
(52) U.S. Cl. .......................................... 455/69; 455/101
(58) Field of Classification Search .................... 455/69, 455/522, 10, 63.1, 277.2, 278.1, 436
See application file for complete search history.

(56) References Cited

U.S. PATENT DOCUMENTS

| | | | |
|---|---|---|---|
| 2007/0129094 A1 | 6/2007 | Jeong et al. | |
| 2007/0191050 A1 | 8/2007 | Chang et al. | |
| 2007/0265026 A1 | 11/2007 | You et al. | |
| 2008/0008113 A1 | 1/2008 | Cho et al. | |
| 2008/0130527 A1 | 6/2008 | Huh et al. | |
| 2008/0166976 A1 | 7/2008 | Rao | |
| 2010/0087221 A1* | 4/2010 | Srinivasan et al. | 455/522 |
| 2011/0194423 A1* | 8/2011 | Cho et al. | 370/252 |

FOREIGN PATENT DOCUMENTS
WO 2011/059568 A2 5/2011

OTHER PUBLICATIONS

International Search Report and Written Opinion received for PCT Patent Application No. PCT/US2010/049509, mailed on May 26, 2011, 12 pages.
Kim et al., "Proposed Modification on Power Control Section (AWD-15.3.9.4)", IEEE C802.16m-09/1524r1, Jul. 6, 2009.
"IEEE Standard for Local and metropolitan area networks—Part 16: Air Interface for Fixed Broadband Wireless Access Systems", IEEE Std 802.16-2009, May 29, 2009.
Cudak, Mark, "IEEE 802.16m System Requirements", IEEE 802.16 Broadband Wireless Access Working Group, IEEE 802.16m-07/002r8, Jan. 15, 2009, pp. 1-31.
Hamiti, Shkumbin, "IEEE 802.16m System Description Document [Draft]", IEEE 802.16 Broadband Wireless Access Working Group, IEEE 802.16m-08/003r7, Feb. 7, 2009, pp. 1-170.
Hamiti, Shkumbin, "IEEE 802.16m System Description Document [Draft]", IEEE 802.16 Broadband Wireless Access Working Group, IEEE 802.16m-08/003r8, Apr. 10, 2009, pp. 1-179.
Chen, Yih-Shen et al., "Joint Power Control and link adaptation scheme for IEEE 802.16m", IEEE 802.16 Broadband Wireless Access Working Group, IEEE C802.16m-08/569, Jul. 7, 2008, pp. 1-4.

(Continued)

*Primary Examiner* — Tu X Nguyen
(74) *Attorney, Agent, or Firm* — Schwegman, Lundberg & Woessner, P.A.

(57) ABSTRACT

Techniques are described that provide uplink power control techniques that can support different uplink multi-input multi-output (MIMO) transmission schemes. Open and closed loop power control schemes can be used to prescribe the power level of the mobile station.

12 Claims, 6 Drawing Sheets

OTHER PUBLICATIONS

Lu, Zhaohua et al.,"Power Control Based on Interference Management for Uplink", IEEE 802.16 Broadband Wireless Access Working Group, IEEE C802.16m-08/572, Jul. 7, 2008, pp. 1-3.

Vrzic, Sophie et al., "Proposal for IEEE 802.16m Uplink Power Control", Document No. IEEE C802.16m-08/613, Jul. 7, 2008, pp. 1-12.

Wang, Fan et al., "IEEE 802.16m UL Fractional Power Control", Document No. IEEE C802.16m-08/627, Jun. 7, 2008, pp. 1-6.

Wang, Xiaoyi et al., "Interference Constraint Power Control", Document No. IEEE C80216m-08/630, Jul. 7, 2008, pp. 1-8.

Koc, Ali Taha et al., "Uplink Power Control Recommendations for IEEE 802.16m", Document No. IEEE C802.16m-08/666, Jul. 7, 2008, 18 pages.

Kim, Jihyung et al. ,"Uplink Power Control in the Base Station", Document No. IEEE C802.16m-08/668, Jul. 7, 2008, pp. 1-6.

Park, Jeongho et al., "Uplink Power Control in 802.16m",IEEE 802.16 Presentation Submission Template (Rev. 9), Document No. IEEE C802.16m-08/675, Jul. 7, 2008, 15 pages.

Loa, Kanchei (Ken) et al., "Power Control in 802.16m", IEEE 802.16 Broadband Wireless Access Working Group, IEEE C802.16m-08/682r1, Jul. 7, 2008, pp. 1-4.

Loa, Kanchei (Ken) et al., "Power Control in 802.16m", IEEE C802.16m-08/682r2, IEEE 802.16 Broadband Wireless Access Working Group, Jul. 14, 2008, pp. 1-4.

Loa, Kanchei (Ken) et al., "Power Control in 802.16m", IEEE 802.16 Broadband Wireless Access Working Group, IEEE C802.16m-08/682r3, Jul. 15, 2008, 4 pages.

Loa, Kanchei (Ken) et al., "Power Control in 802.16m", IEEE 802.16 Broadband Wireless Access Working Group, IEEE C802.16m-08/682r4, Jul. 16, 2008, pp. 1-4.

Liu, Juejun et al., "Uplink Power Control of 16m", IEEE 802.16 Broadband Wireless Access Working Group, IEEE C802.16mUL-08_705, Jul. 7, 2008, pp. 1-6.

Kim, Dong-Cheol et al., "Uplink Power Control Design—Considerations and Mechanism", IEEE 802.16 Broadband Wireless Access Working Group, IEEE C802.16m-08/813, Jul. 7, 2008, pp. 1-13.

Yang, Rongzhen et al.,"Uplink Open Loop Power Control Recommendations for IEEE 802.16m Amendment", IEEE 802.16 Presentation Submission Template (Rev. 9), IEEE S802.16m-09/0703, Mar. 7, 2009, 19 pages.

Yang, Rongzhen et al. "IEEE 802.16m Amendment Text Proposal for Uplink Open-Loop Power Control", IEEE 802.16 Broadband Wireless Access Working Group, IEEE C802.16m-09/0844r4, May 5, 2005, pp. 1-6.

Yang, Rongzhen et al., "Supporting material for Uplink OLPC Proposal C80216m-09/0844", IEEE 802.16 Presentation Submission Template (Rev. 9), Document No. IEEE S802.16m-09/0845, Mar. 7, 2009, 57 pages.

Loa, Kanchei (Ken) et al., "Power Control in 802.16m", IEEE S802.16m-08/682, Jul. 11, 2008, 10 pages.

Loa, Kanchei (Ken) et al., "Power Control in 802.16m", IEEE S802.16m-08/682r2, Jul. 15, 2008, 9 pages.

"Part 16: Air Interface for Fixed and Mobile Broadband Wireless Access Systems", Draft Amendment to IEEE Standard for Local and metropolitan area networks, IEEE P802.16m/D2, sponsored by LAN/MAN Standards Committee & IEEE Microwave Theory and Techniques Society, Oct. 2009, Section 15.3.9.4 "Uplink Power Control", pp. 511-516.

International Preliminary Report on Patentability received for PCT Patent Application No. PCT/US2010/049509, mailed on May 15, 2012, 7 pages.

"International Application Serial No. PCT/US2010/049509, International Preliminary Report on Patentability mailed May 15, 2012", 6 pgs.

* cited by examiner

TECHNIQUES TO CONTROL UPLINK POWER

FIELD

The subject matter disclosed herein relates generally to techniques to determine transmitter power of a wireless signal.

RELATED ART

In wireless networks, OFDM/OFDMA with multi-input multi-output (MIMO) is an important technology for next-generation mobile broadband networks. Uplink power control is an extremely important component of MIMO OFDM/OFDMA. Uplink power control involves controlling the transmit power level to balance the link performance and terminal battery power and to reduce the inter-base station uplink co-channel interference. Increasing transmission power of one mobile station enjoys the increase of its link performance but increases interferences to other mobile stations of neighboring base stations because they use the same channel. This results in decreased link performance of the other mobile stations. Therefore, in deciding uplink power level, it is important to balance the performance of a particular link with interference to the other base stations.

Current power control schemes focus on the uplink power control for a single transmit antenna at the mobile station without considering uplink MIMO operation. Uplink MIMO operation can be implemented as single-user MIMO (SU-MIMO) by using more than one transmit antenna at the mobile station. Uplink MIMO operation can also be implemented as a MU-MIMO (also known as collaborative MIMO) by allowing simultaneous uplink transmission from two or more mobile stations in the same frequency and time resource, where each mobile station can use one or more transmit antennas.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
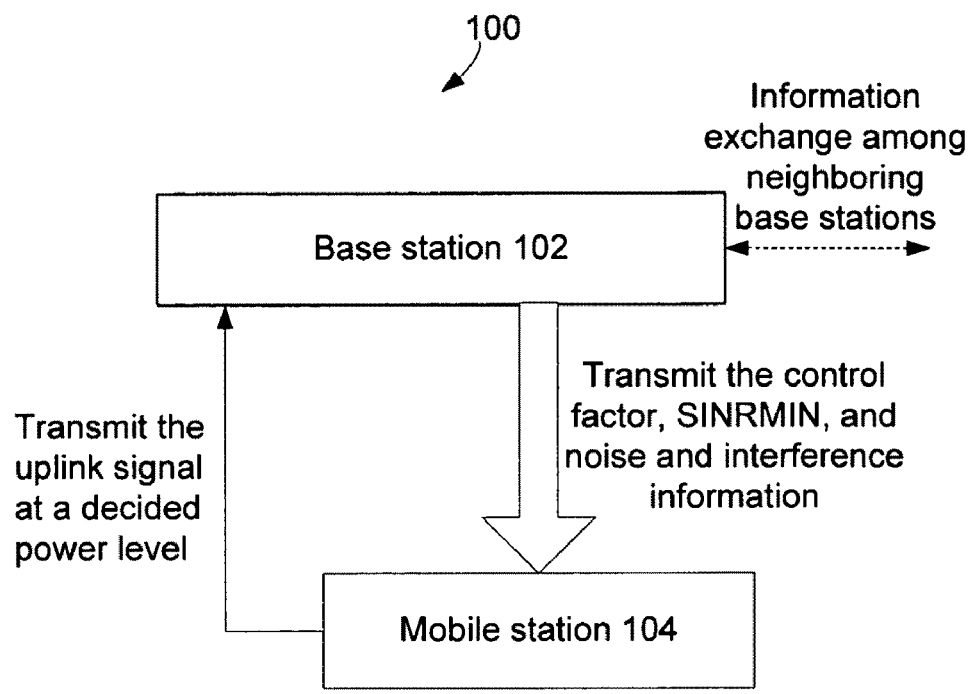
FIG. 1 depicts in block diagram form, an information exchange between a base station and mobile station during an open loop power control (OLPC) mode, in accordance with an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to IEEE 802.11a, 802.11b, 802.11e, 802.11g, 802.11h, 802.11i, and 802.11n as well as any version or draft of IEEE 802.16e and IEEE 802.16m.

Some embodiments provide uplink power control (ULPC) techniques that can support different uplink multi-input multi-output (MIMO) transmission schemes for both open and closed loop power control. Some embodiments provide ULPC techniques based on the rule of maximum uplink spectral efficiency (SE). Some embodiments support the operation of different mobile stations using different uplink multi-input multi-output (MIMO) transmission schemes and different transmit (Tx) antennas. Embodiments can be applied to next generation OFDMA-based wireless broadband technologies and related products, such as, but not limited to, IEEE 802.16e, IEEE 802.16m, 3GPP LTE, as well as 3GPP2 UMB, to increase the uplink spectral efficiency significantly by controlling the uplink interference and the tradeoff between the uplink cell-edge user spectral efficiency and the uplink average spectral efficiency.

In various embodiments, for MU-SIMO, the following target signal to interference and noise ratio can be applied:

$$SINR_{Target} = \gamma \times SIR_{DL} - \beta$$

Variable $\gamma$ is used to control interference. If neighbor sectors have higher percentage of MU-MIMO selection, $\gamma$ can be decreased to reduce interference in the network and maximize the overall spectral efficiency. $\beta$ is the offset value to achieve the maximum spectral efficiency, and it can be applied as:

$$\beta = \frac{1}{N_r},$$

where $N_r$ is the number of receive antennas at the base station. However, $\beta$ can be other values. In various embodiments, when the mobile station switches between the SU-MIMO and MU-MIMO, the same Tx power can be used.

Various embodiments can control the interference in the network, provide a good tradeoff between the overall system spectral efficiency and cell-edge user performance, and support different uplink SU-MIMO and MU-MIMO cases with the same control scheme.

FIG. 1 depicts in block diagram form, an information exchange between a base station and a mobile station during an open loop power control (OLPC) mode, in accordance with an embodiment. Base station 102 can receive information such as noise and interference level (NI) from neighboring base stations (not shown) using a network (not depicted) such as but not limited to a backhaul network. Base station 102 can broadcast or unicast to mobile station 104 a control factor $\gamma$, $SINR_{MIN}$, as well as the NI information of the frequency partition that the mobile station is assigned. Control factor $\gamma$ represents a fairness and interference over thermal (IoT) control factor. Control factor $\gamma$ can be determined by the base station using a vendor-specific methodology. For example, if neighbor sectors have higher percentage of MU-MIMO selection, control factor $\gamma$ can be decreased to reduce interference in the network and maximize the overall spectral efficiency. For example, when the base station is informed that the neighboring base stations have high uplink interference level, control factor $\gamma$ can be reduced. Otherwise, the same level is maintained or can be increased.

$SINR_{MIN}$ represents the signal to interference and noise ratio (SINR) requirement for the minimum data rate expected by the base station and is described with regard to equation (b) below.

Base station 102 can decide to broadcast or unicast control factor $\gamma$, $SINR_{MIN}$, and NI to mobile station 104 in a manner defined in the IEEE 802.16m Draft Standard (D1) (2009). A decision to broadcast or unicast may be made by base station 102 using any vendor specific technique. Base station 102 can decide the broadcast or unicast period.

After mobile station 104 receives $\gamma$, $SINR_{MIN}$, and NI from base station 102, mobile station 104 can use the OLPC transmission power control calculation formula in equation (a) to determine its transmission power per subcarrier and per antenna:

$$P(dBm) = L + SINR_{Target} + NI \quad (a)$$

where:
P is the TX power level (dBm) per subcarrier from each transmit (Tx) antenna. The mobile station's Tx antenna gain may be factored into determination of P. For IEEE 802.16m Draft Standard (D1) (2009) compliant mobile stations, power level P is determined for each stream.

L is the estimated average current uplink propagation loss, which considers the mobile station's Tx antenna gain and path loss but may exclude the base station's Rx antenna gain. L may be determined by a mobile station from downlink signaling. Due to channel reciprocity, the measured downlink average path loss is used to estimate the uplink average path loss.

$SINR_{Target}$ is calculated based on equation (b) below.

NI is the estimated average power level (dBm) of the noise and interference per subcarrier at the base station and may not consider the base station's Rx antenna gain. Techniques for determining noise plus interference level are well known and described, for example, in sections 8.3.7.4.2, 8.4.10.3.2, 8.4.11.3, 8.4.5.3.19, and 8.3.9.3 of IEEE 802.16 Rev2/D7 (October 2008).

Various embodiments implement the signal to interference and noise ratio (SINR) target of the IEEE 802.16e and IEEE 802.16m standards using of the following equation:

$$SINR_{Target} = 10\log10\left(\max\left(10 \wedge \left(\frac{SINR_{MIN}}{10}\right), \gamma \times SINR_{DL} - \frac{1}{N_r}\right)\right) \quad (b)$$

where
$SINR_{MIN}$ is the SINR requirement for the minimum data rate expected by the base station. In various embodiments, $SINR_{MIN}$ is determined by the base station using vendor-specific techniques.

$N_r$ is the number of receive antennas at the base station.

$SINR_{DL}$ is the ratio of useful downlink signal to the downlink interference power measured at the mobile station. $SINR_{DL}$ can be selected by a base station using a vendor-specific technique.

Various embodiments support multi-mode operation for IEEE 802.16m network communications and legacy IEEE 802.16e communications. When open-loop power control is used to control transmission power of a mobile station, the power per subcarrier and per transmit (Tx) antenna for the uplink transmission for uplink bursts can be set according to equation (c):

$$P(dBm) = L + SINR_{Target} + NI + Offset\_AMS_{perAMS} + Offset\_ABS_{perAMS} \quad (c)$$

where
P is the TX power level (dBm) per subcarrier and for a single transmission antenna for the current transmission. For IEEE 802.16m Draft Standard (D1) (2009) compliant systems, P is the power output per stream.

L is the estimated average current uplink propagation loss and includes AMS's Tx antenna gain and path loss. AMS refers to an Advanced Mobile Station as described in IEEE 802.16m Draft Standard (D1) (2009), although L can be determined for any mobile station in a manner described in the IEEE 802.16e standard. L may be determined based on the total power received on the active subcarriers of the frame preamble and with reference to the BS_EIRP parameter sent by the advanced base station. For open loop power control, L may be determined by the mobile station. For example, L may be determined by the mobile station for open link power control by measuring total downlink power received from a preamble and by using the BS_EIRP parameter sent by a base station. For example, L can be estimated by channel symmetry: L=BS_EIRP−RSS, where RSS is Received Signal Strength of received preamble.

$SINR_{Target}$ is the target uplink SINR received by an advanced base station (ABS) and is described with regard to equation (d) below. ABS is described for example in the IEEE 802.16m Draft Standard (D1) (2009). However, the target uplink SINR can be that received by IEEE 802.16e base stations.

NI is the estimated average power level (dBm) of the noise and interference per subcarrier at the ABS, not including ABS's Rx antenna gain.

Offset_AMS$_{perAMS}$ is a correction term for AMS-specific power offset. This value may be controlled by the AMS and its initial value may be set to zero. In IEEE 802.16m Draft Standard (D1) (2009), determination of the Offset_AMS$_{perAMS}$ value is described with regard to "Offset_SSperSS," as well as Section 8.4.10.3.2, "passive UL open-loop power control," and "active UL open-loop power control."

Offset_ABS$_{perAMS}$ is also a correction term for AMS-specific power offset. This value may be controlled by an ABS using power control messages. Determination of Offset_ABS$_{perAMS}$ is made by an ABS. The ABS has the flexibility to decide Offset_ABS$_{perAMS}$ using a vendor specific technique.

When the mobile station connects to a network, mobile station 104 can negotiate which SINR$_{Target}$ calculation formula to support. The selected SINR$_{Target}$ calculation formula may be signaled using a power control message. In various embodiments, two modes can be selected. For modes 1 and 2, the SINR$_{Target}$ is defined as:

$$SINR_{target} = \begin{cases} C/N - 10\log10(R), & \text{mode1} \\ SINR_{OPT}, & \text{mode2} \end{cases} \quad (d)$$

where

C/N is the normalized carrier-to-noise ratio of the modulation/FEC rate for the current transmission. Determination of C/N may be described with regard to table 514 in section 8.4.10.3 of IEEE 802.16-2009.

R is the number of repetitions for the modulation/FEC rate. Determination of C/N may be described with regard to table 514 in section 8.4.10.3 of IEEE 802.16-2009.

SINR$_{OPT}$ is the target SINR value for IoT control and provides a tradeoff between overall system throughput and cell edge performance. SINR$_{OPT}$ can be determined using the following equation:

$$SINR_{OPT} = 10\log10\left(\max\left(10^{\wedge}\left(\frac{SINR_{MIN}}{10}\right), \gamma \times SINR_{DL} - \frac{1}{N_r}\right)\right)$$

where

SINR$_{MIN}$ is the SINR requirement for the minimum rate expected by the ABS and can be set using a power control message. In various embodiments, SINR$_{MIN}$ is a 4 bit field and represents the dB value among {−3, −2.5, −2, −1.5, −1, 0, 0.5, 1, 1.5, 2, 2.5, 3, 3.5, 4, 4.5, 5}. Selection of SINR$_{MIN}$ can be made using a vendor-specific technique.

γ represents the fairness and IoT control factor and may be decided by the ABS and set using a power control message. In various embodiments, γ is a 4 bit field and represents a value among {0, 0.1, 0.2, 0.3, 0.4, 0.5, 0.6, 0.7, 0.8, 0.9, 1.0, 1.1, 1.2, 1.3, 1.4, 1.5}. Selection of γ can be made using a vendor-specific technique.

SINR$_{DL}$ represents the ratio of downlink signal to interference and noise power, as measured by the AMS. Determination of SINR$_{DL}$ can be made using a technique to determine CINR that is described in section 8.4.11.1 of IEEE 802.16-2009.

Nr represents the number of receive antennas at the ABS.

Figure 2:
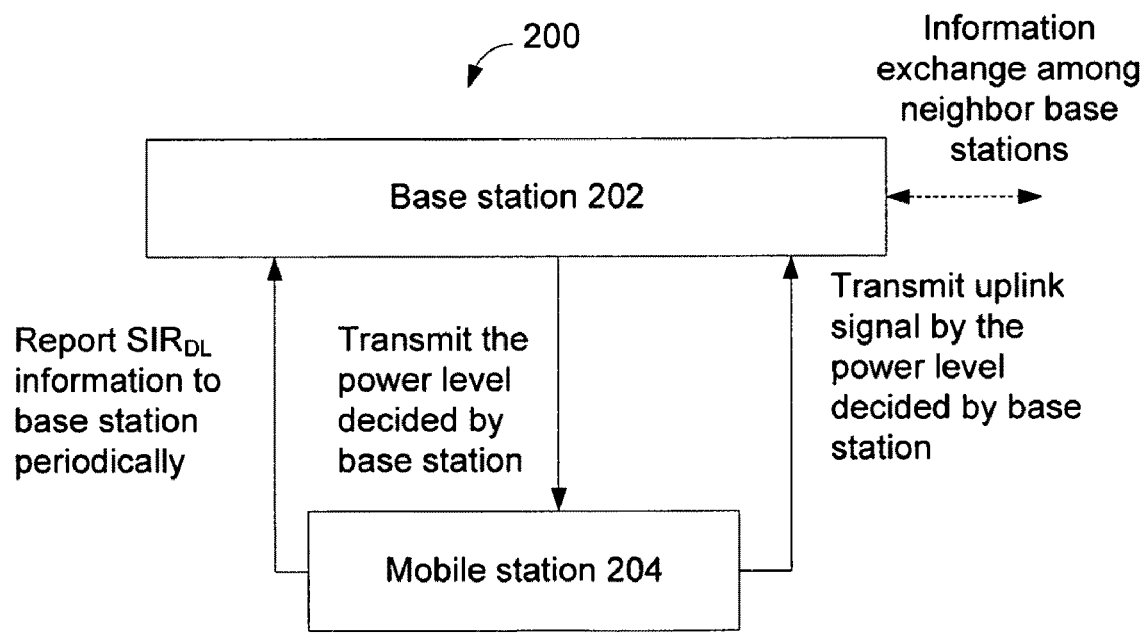
FIG. 2 depicts in block diagram form, an information exchange between a base station and mobile station during a closed loop power control (CLPC) mode, in accordance with an embodiment.

FIG. 2 depicts in block diagram form, an information exchange between a base station and mobile station during a closed loop power control mode, in accordance with an embodiment. Base station 202 may not broadcast the γ, SINR$_{MIN}$, and NI to mobile station 204. Instead, mobile station 204 reports the ratio of downlink useful signal to the downlink interference power measured at mobile station 204 (SIR$_{DL}$) to base station 202 so that base station 202 can determine the uplink transmission power of mobile station 204. In various embodiments, mobile station 204 is to measure the SIR$_{DL}$ based on the downlink preamble signal strength and report the SIR$_{DL}$ to base station 202. After base station 202 receives the path loss information from mobile station 204, base station 202 is to determine uplink power level of mobile station 204 using the following procedure.

(1) Measure the path loss based on the mobile station's previous transmission(s) of SIR$_{DL}$ to the base station. Determination of path loss from SIR$_{DL}$ can be made by the base station based on the received signal power of message and AMS Tx power. For example, path loss can be determined using the following formula: P_dB(AMS Tx Power)−P_dB (received power). By contrast, determination of estimated average current uplink propagation loss (L) is made by using the measurement of a downlink pathloss value.

(2) Based on SIR$_{DL}$ and the path loss information, calculate the transmission power of the mobile station according to equation (a) or (c). Path loss information is substituted for the L value in equations (a) and (c).

(3) Unicast the power level to mobile station 204. In various embodiments, messages described with regard to section 8.4.11.1 of IEEE 802.16-2009 can be used to transmit SIR$_{DL}$ and power level.

Figure 3:
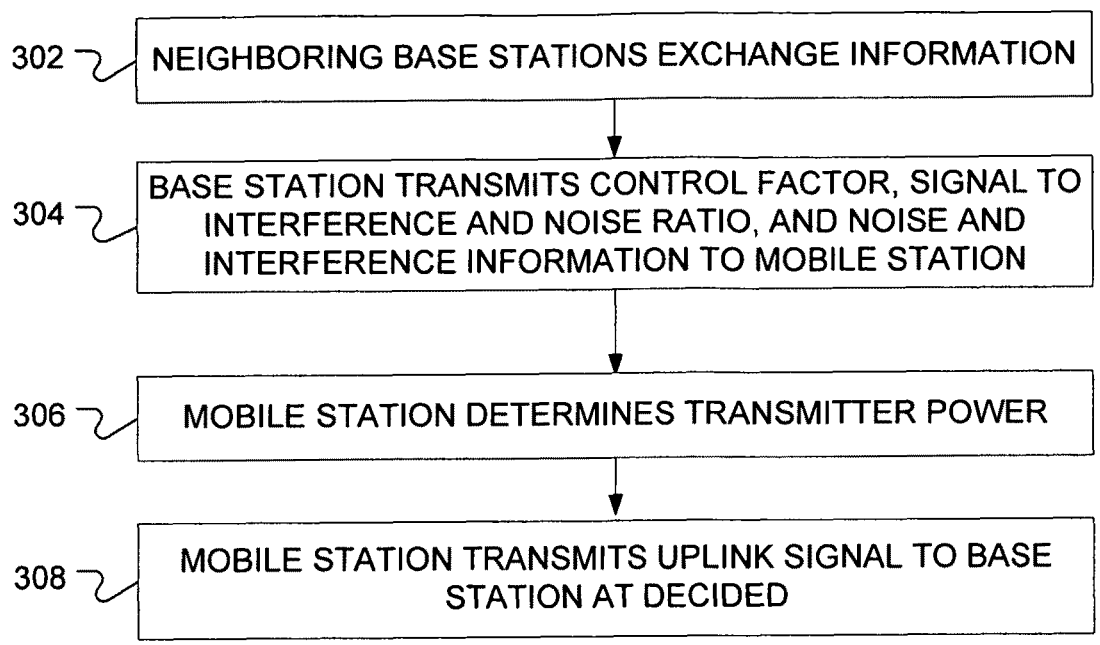
FIG. 3 depicts an example process that can be used by a mobile station to determine transmitter power using open loop power control (OLPC) mode, in accordance with an embodiment.

FIG. 3 depicts an example process that can be used by a mobile station to determine transmitter power using open loop power control (OLPC) mode, in accordance with an embodiment.

Block 302 includes neighboring base stations exchanging information such as noise and interference level. In various embodiments, a wireless service operator decides what base stations are neighboring based in part on a layout and locations of base stations. For example, a network such as a backhaul network can be used to exchange information.

Block 304 includes a base station transmitting a control factor γ and SINR$_{MIN}$ to the mobile station as well as the noise and interference of the frequency partition that the mobile station is assigned. For example, the base station may transmit control factor γ, SINR$_{MIN}$, and noise and interference by broadcasting or unicasting. The base station can decide the broadcast or unicast period. The base station can determine the control factor γ and $SINR_{MIN}$ using vendor-specific techniques.

Block 306 includes the mobile station determining a transmit power level. For example, techniques to determine transmit power level are described with regard to equations (a) or (c).

Block 308 includes the mobile station transmitting the uplink signal to the base station at the determined transmit power level.

Figure 4:
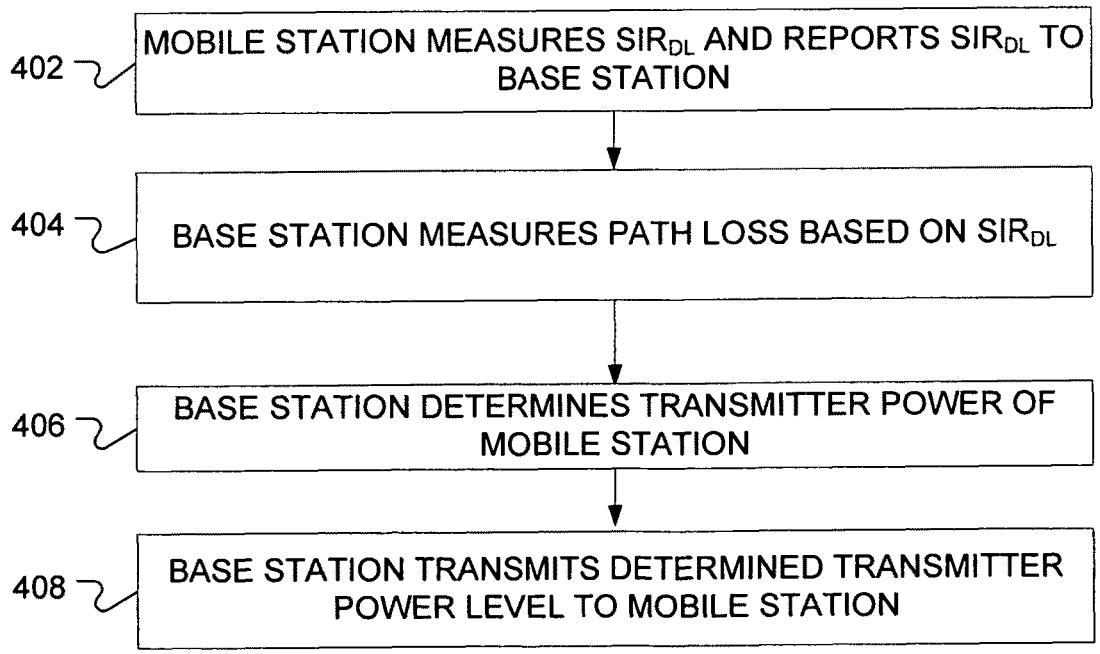
FIG. 4 depicts an example process that can be used by a mobile station to determine transmitter power using closed loop power control (CLPC), in accordance with an embodiment.

FIG. 4 depicts an example process that can be used by a mobile station to determine transmitter power using closed loop power control (CLPC), in accordance with an embodiment.

Block 402 includes the mobile station measuring the $SIR_{DL}$ based on the downlink preamble signal strength and reporting the $SIR_{DL}$ to the base station associated with the mobile station.

Block 404 includes the base station measuring the path loss based on the mobile station's previous transmission(s) of $SIR_{DL}$. Determination of path loss from $SIR_{DL}$ can be made by the base station based on the received signal power message and AMS Tx power.

Block 406 includes the base station determining the transmission power of the mobile station according to equation (a) or (c) based on $SIR_{DL}$ and the path loss information. Path loss information is substituted for the L value in equations (a) and (c).

Block 408 includes the base station transmitting the power level to the mobile station. Thereafter, the mobile station can transmit at the prescribed power level.

Various embodiments include increasing the Tx PSD by step ΔPSD and determining a Tx power spectral density, $PSD_{TX}$, until the spectral efficiency (SE) change is negative. For example, SE change can be defined as the difference of the SE gain in the home (or serving) sector and the SE loss in the neighboring sectors.

To predict the SE loss in the i-th neighboring sector, the following information may be first obtained: (a) channel loss $CL_i$ from the mobile station to the i-th neighboring base station, (b) noise plus Interference level $NI_i$ in the i-th neighboring sector, and (c) transmit power density $PSD_{TX,i}$ of the mobile station operating on the same channel in the i-th neighboring sector.

When a mobile station enters a network, the channel loss $CL_H$ and $CL_i$ from the mobile station to the home base station and the ith neighboring base station (i=1, 2, . . . , N) can be estimated by using the downlink preamble (synchronization channel). Among these parameters, $CL_i$ can be estimated at the mobile station using the downlink preamble sent from the i-th base station, and $NI_i$ must be first exchanged among the base stations and then broadcast. However, obtaining such information is at the cost of high feedback overhead and complicated hardware realization.

Noise plus Interference level (NI) is the sum of the power density of noise and interference which can be estimated at each base station. Neighboring NI ($NI_1$, $NI_2$, . . . , $NI_N$) can be acquired by exchanging information among the base stations through the network backhaul or other manners. The home NI ($NI_H$) can be broadcast by the base station. The relationship between NI and IoT can be expressed as:

$$NI = IoT * P_{Noise} + P_{Noise}$$

where $P_{Noise}$ is the thermal noise power density.

Figure 5:
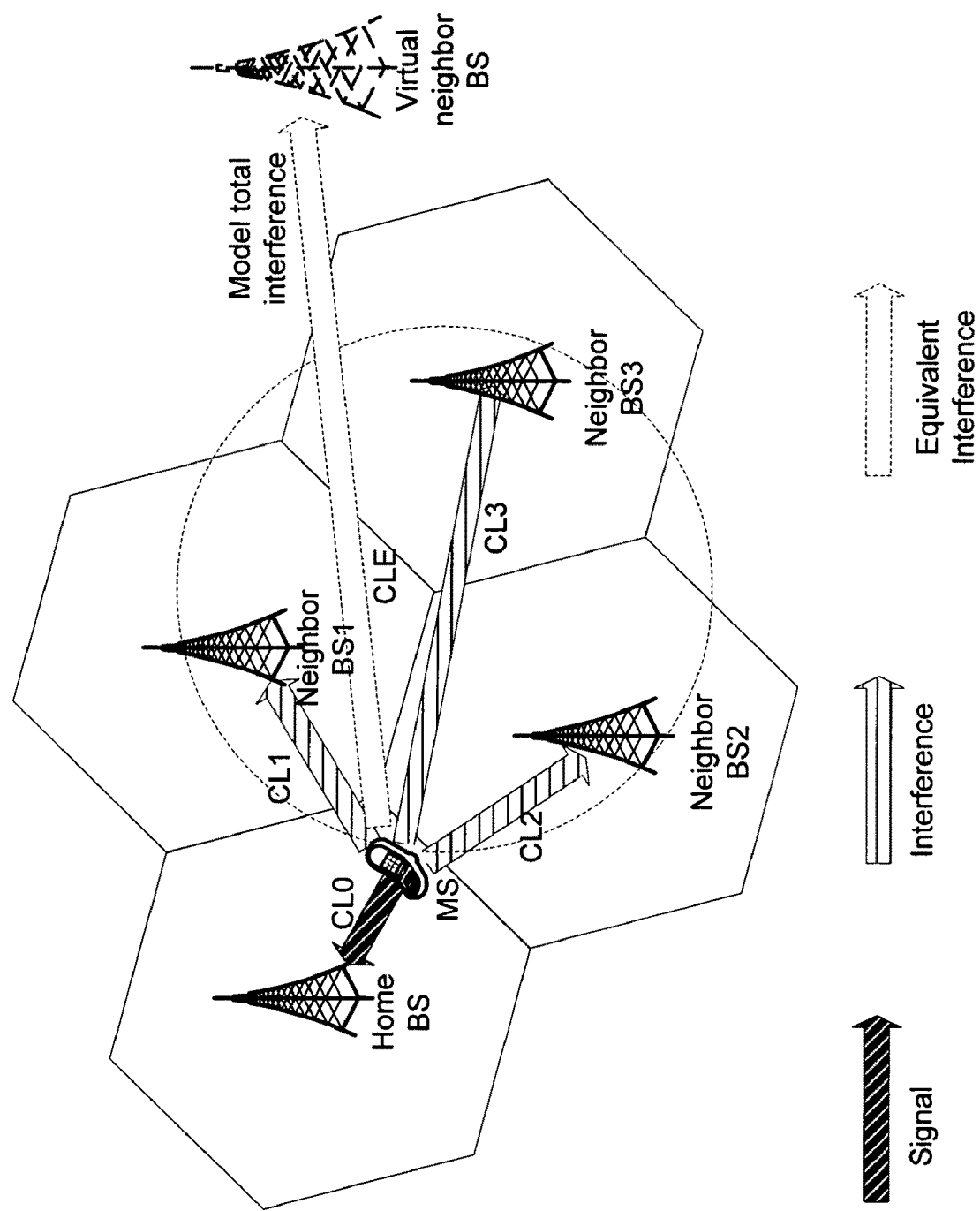
FIG. 5 depicts an example of a virtual cell model, in accordance with an embodiment.

A virtual cell model can be used to predict the SE loss in all neighboring sectors. FIG. 5 depicts an example of a virtual cell model, in accordance with an embodiment. Assume that there exists a virtual neighboring base station which suffers from the combined interference caused by the current mobile station to the neighboring sectors 1~N. The channel loss from mobile station to this virtual base station is defined as $CL_I$. Then, the following equation holds:

$$\frac{PSD_{TX,Ant}}{CL_I} = \sum_{i=1}^{N} \frac{PSD_{TX}}{CL_i} \Rightarrow CL_I = \left(\sum_{i=1}^{N} \frac{1}{CL_i}\right)^{-1} \quad (2)$$

Using this equivalent channel loss allows estimation of the SINR of the downlink preamble for uplink power control but not each individual $CL_I$.

In general, each cell can use single-user MIMO (SU-MIMO) or MU-MIMO. Accordingly, the minimum SINR ($SINR_{MIN}$) are determined for four combinations: (1) home cell SU-MIMO and virtual cell SU-MIMO, (2) home cell MU-MIMO and virtual cell SU-MIMO, (3) home cell SU-MIMO and virtual cell MU-MIMO, and (4) home cell MU-MIMO and virtual cell MU-MIMO. It can be shown that the power control formula based on the above idea can be unified into the signal to interference and noise ratio (SINR) of equation (b).

In the case of home cell SU-MIMO and virtual cell SU-MIMO, the SE gain in the home sector for each mobile station can be modeled in the following manner. Suppose that the current power spectral density is $PSD_{TX,Ant}$ and the Tx power density increases by a small step, ΔPSD. Then, the new power density is $PSD_{New,Ant} = PSD_{TX,Ant} + \Delta PSD$ and the resulting SE improvement is $$SE_{Gain} = \log(1 + N_r * SINR_{New,Ant}^H) -$$
$$\log(1 + N_r * SINR_{Orig,Ant}^H)$$
$$= \log\left(\frac{1 + N_r * SINR_{New,Ant}^H}{1 + N_r * SINR_{Orig,Ant}^H}\right)$$

where,

SINR is the Signal to Interference plus Noise Ratio, $SINR_{New,Ant}^H$ is the new SINR per receive antenna after increasing the power spectral density by ΔPSD, $SINR_{Orig,Ant}^H$ is the original SINR per receive antenna and $N_r$ is the number of receive antenna.

In general, the instantaneous channel realization is estimated in advance so as to compute the exact SINR. However, this requires large computational overhead and results in long processing delay. Using the slow fading estimation to compute the SINR, and the resulting SE gain is meaningful in the sense of stochastic average. Based on those assumptions, the following computations are made:

$$SINR_{Orig,Ant}^H = \frac{PSD_{TX,Ant}/CL_H}{NI_{H,Ant}}$$

$$SINR_{New,Ant}^H = \frac{(PSD_{TX,Ant} + \Delta PSD)/CL_H}{NI_{H,Ant}}$$

The SE gain after increasing the power spectral density of this mobile station becomes:

$$SE_{Gain} = \log\left(\frac{1 + \frac{N_r*(PSD_{TX} + \Delta PSD)}{CL_H*NI_{H,Ant}}}{1 + \frac{N_r*PSD_{TX,Ant}}{CL_H*NI_{H,Ant}}}\right)$$

$$= \log\left(1 + \frac{\frac{N_r*\Delta PSD}{CL_H}}{NI_{H,Ant} + \frac{N_r*PSD_{TX,Ant}}{CL_H}}\right)$$

The SE loss in the virtual sector can be expressed as $$SE_{Loss}^I = \log\left(\frac{1 + N_r*SINR_{Orig,Ant}^I}{1 + N_r*SINR_{New,Ant}^I}\right)$$

$$= \log\left(\frac{1 + \frac{N_r*SNR_{I,Ant}*P_{Noise,Ant}}{NI_{I,Ant}}}{1 + \frac{N_r*SNR_{I,Ant}*P_{Noise,Ant}}{NI_{I,Ant} + \Delta PSD/CL_I}}\right)$$

$$= \log\left(1 + \frac{\frac{\Delta PSD}{CL_I*NI_{I,Ant}}}{1 + \frac{N_r*SNR_{I,Ant}*P_{Noise,Ant}}{NI_{I,Ant} + \Delta PSD/CL_I}} \frac{N_r*SNR_{I,Ant}*P_{Noise,Ant}}{NI_{I,Ant} + \Delta PSD/CL_I}\right)$$

As already mentioned, the SE change is defined as the improvement of the SE gain in the home sector over the SE loss in all the neighboring sectors, which can be approximated as $SE_{Loss}^I$. If increasing the Tx power spectral density leads to a positive SE change, then the overall throughput in all sectors should increase as well, as well as seeking higher Tx power spectral density. On the contrary, if a negative SE change is calculated, then increasing the Tx power spectral density is not beneficial, and the original power density should be the best level obtainable. From this perspective, the best Tx power spectral density is the level such that the SE change equals to 0 when $\Delta PSD \to 0$ and leads to signal to interference and noise ratio of equation (b):

$$\Delta SE = SE_{Gain} - SE_{Loss}^I = 0(\Delta PSD \to 0)$$

$$\Rightarrow \frac{\frac{N_r*\Delta PSD}{CL_H}}{NI_{H,Ant} + \frac{N_r*PSD_{TX,Ant}}{CL_H}} =$$

$$\frac{\frac{\Delta PSD}{CL_I*NI_{I,Ant}}}{1 + \frac{N_r*SNR_{I,Ant}*P_{Noise,Ant}}{NI_{I,Ant} + \Delta PSD/CL_I}} \frac{N_r*SNR_{I,Ant}*P_{Noise,Ant}}{NI_{I,Ant} + \Delta PSD/CL_I}$$

$$\Rightarrow \frac{1}{NI_{H,Ant} + \frac{N_r*PSD_{TX,Ant}}{CL_H}} = \frac{CL_H/CL_I}{1 + N_r*SINR_{I,Ant}} \frac{SINR_{I,Ant}}{NI_{I,Ant}}$$

$$\Rightarrow NI_{H,Ant} + \frac{N_r*PSD_{TX,Ant}}{CL_H} = (1 + N_r*SINR_{I,Ant})*\frac{CL_I}{CL_H}*\frac{NI_{I,Ant}}{SINR_{I,Ant}}$$

$$\Rightarrow PSD_{TX,Ant} = \left\{(1 + N_r*SINR_{I,Ant})*\frac{CL_I}{CL_H}*\frac{NI_{I,Ant}}{SINR_{I,Ant}} - NI_{H,Ant}\right\}*\frac{CL_H}{N_r}$$

$$\Rightarrow PSD_{TX,Ant} = \frac{1}{N_r}*\left\{\frac{CL_I*NI_{I,Ant}*(1 + N_r*SINR_{I,Ant})}{SINR_{I,Ant}} - NI_{H,Ant}*CL_H\right\}$$

$$\Rightarrow SINR_{H,Ant} = \frac{PSD_{TX,Ant}}{CL_H*NI_{H,Ant}}$$

$$= \frac{1}{N_r}*\left\{\frac{CL_I*NI_{I,Ant}*(1 + N_r*SINR_{I,Ant})}{SINR_{I,Ant}*CL_H*NI_{H,Ant}} - 1\right\}$$

$$= \underbrace{\frac{NI_{I,Ant}}{NI_{H,Ant}}*\left(1 + \frac{1}{N_r*SINR_{I,Ant}}\right)}_{\gamma}*\underbrace{\frac{CL_I}{CL_H}}_{SIR_{DL}} - \frac{1}{N_r}$$

$$= \gamma*SIR_{DL} - \frac{1}{N_r}$$

To guarantee the throughput of cell-edge users, it is always beneficial to limit the minimum SINR ($SINR_{MIN}$), which leads to signal to interference and noise ratio of equation (b).

In the case of home cell MU and virtual cell SU, the SE gain corresponds to gain from two users and can be expressed as:

$$SE_{Gain} = 2*\log\left(\frac{1 + \frac{N_r*(PSD_{TX} + \Delta PSD)}{CL_H*NI_{H,Ant}}}{1 + \frac{N_r*PSD_{TX,Ant}}{CL_H*NI_{H,Ant}}}\right)$$

$$= \log\left(1 + \frac{\frac{N_r*\Delta PSD}{CL_H}}{NI_{H,Ant} + \frac{N_r*PSD_{TX,Ant}}{CL_H}}\right)^2 \approx$$

$$\log\left(1 + \frac{\frac{2*N_r*\Delta PSD}{CL_H}}{NI_{H,Ant} + \frac{N_r*PSD_{TX,Ant}}{CL_H}}\right)$$

Because MU-MIMO is used in the home cell, the interference power to the virtual cell is also doubled:

$$SE_{Loss}^I = \log\left(\frac{1 + \frac{N_r*SNR_{I,Ant}*P_{Noise,Ant}}{NI_{I,Ant}}}{1 + \frac{N_r*SNR_{I,Ant}*P_{Noise,Ant}}{NI_{I,Ant} + 2*\Delta PSD/CL_I}}\right)$$

$$= \log\left(1 + \frac{\frac{2*\Delta PSD}{CL_I*NI_{I,Ant}}}{1 + \frac{N_r*SNR_{I,Ant}*P_{Noise,Ant}}{NI_{I,Ant} + 2*\Delta PSD/CL_I}} \frac{N_r*SNR_{I,Ant}*P_{Noise,Ant}}{NI_{I,Ant} + 2*\Delta PSD/CL_I}\right)$$

Then, the derived optimal Tx power spectral density leads to signal to interference and noise ratio of equation (b).

$$\Delta SE = SE_{Gain} - SE_{Loss}^I = 0(\Delta PSD \to 0)$$

$$\Rightarrow \frac{2*\frac{N_r*\Delta PSD}{CL_H}}{NI_{H,Ant} + \frac{N_r*PSD_{TX,Ant}}{CL_H}} =$$

$$\frac{\frac{2*\Delta PSD}{CL_I*NI_{I,Ant}}}{1 + \frac{N_r*SNR_{I,Ant}*P_{Noise,Ant}}{NI_{I,Ant} + 2*\Delta PSD/CL_I}} \frac{N_r*SNR_{I,Ant}*P_{Noise,Ant}}{NI_{I,Ant} + 2*\Delta PSD/CL_I}$$

$$\Rightarrow \frac{1}{NI_{H,Ant} + \frac{N_r*PSD_{TX,Ant}}{CL_H}} = \frac{CL_H/CL_I}{1 + N_r*SINR_{I,Ant}} \frac{SINR_{I,Ant}}{NI_{I,Ant}}$$

-continued $$\Rightarrow PSD_{TX,Ant} = \frac{1}{N_r} * \left\{ \frac{CL_I * NI_{I,Ant} * (1 + N_r * SINR_{I,Ant})}{SINR_{I,Ant}} - NI_{H,Ant} * CL_H \right\}$$

$$\Rightarrow SINR_{H,Ant} = \underbrace{\frac{NI_{I,Ant}}{NI_{H,Ant}} * \left(1 + \frac{1}{N_r * SINR_{I,Ant}}\right)}_{\gamma} * \underbrace{\frac{CL_I}{CL_H}}_{SIR_{DL}} - \frac{1}{N_r}$$

$$= \gamma * SIR_{DL} - \frac{1}{N_r}$$

In the case of home cell SU and virtual cell MU, the SE gain is the same as derived for home cell SU-MIMO and virtual cell SU-MIMO. However, the SE loss should be doubled, i.e., $$SE_{Loss}^I = 2 * \log\left(\frac{1 + \frac{N_r * SNR_{I,Ant} * P_{Noise,Ant}}{NI_{I,Ant}}}{1 + \frac{N_r * SNR_{I,Ant} * P_{Noise,Ant}}{NI_{I,Ant} + \Delta PSD / CL_I}}\right)$$

$$= \log\left(\frac{1 + \frac{N_r * SNR_{I,Ant} * P_{Noise,Ant}}{NI_{I,Ant}}}{1 + \frac{N_r * SNR_{I,Ant} * P_{Noise,Ant}}{NI_{I,Ant} + \Delta PSD / CL_I}}\right)^2 \approx$$

$$\log\left(1 + \frac{\frac{2 * \Delta PSD}{CL_I * NI_{I,Ant}}}{1 + \frac{N_r * SNR_{I,Ant} * P_{Noise,Ant}}{NI_{I,Ant} + \Delta PSD / CL_I}} \cdot \frac{N_r * SNR_{I,Ant} * P_{Noise,Ant}}{NI_{I,Ant} + \Delta PSD / CL_I}\right)$$

In this case, the optimal Tx power spectral density leads to signal to interference and noise ratio of equation (b):

$$\Delta SE = SE_{Gain} - SE_{Loss}^I = 0(\Delta PSD \to 0)$$

$$\Rightarrow \frac{\frac{N_r * \Delta PSD}{CL_H}}{NI_{H,Ant} + \frac{N_r * PSD_{TX,Ant}}{CL_H}} =$$

$$\frac{\frac{2 * \Delta PSD}{CL_I * NI_{I,Ant}}}{1 + \frac{N_r * SNR_{I,Ant} * P_{Noise,Ant}}{NI_{I,Ant} + \Delta PSD / CL_I}} \cdot \frac{N_r * SNR_{I,Ant} * P_{Noise,Ant}}{NI_{I,Ant} + \Delta PSD / CL_I}$$

$$\Rightarrow \frac{1}{NI_{H,Ant} + \frac{N_r * PSD_{TX,Ant}}{CL_H}} = \frac{2 * CL_H / CL_I}{1 + N_r * SINR_{I,Ant}} \cdot \frac{SINR_{I,Ant}}{NI_{I,Ant}}$$

$$\Rightarrow PSD_{TX,Ant} = \frac{1}{N_r} * \left\{ \frac{CL_I * NI_{I,Ant} * (1 + N_r * SINR_{I,Ant})}{2 * SINR_{I,Ant}} - NI_{H,Ant} * CL_H \right\}$$

$$\Rightarrow SINR_{H,Ant} = \underbrace{\frac{1}{2} * \frac{NI_{I,Ant}}{NI_{H,Ant}} * \left(1 + \frac{1}{N_r * SINR_{I,Ant}}\right)}_{\gamma} * \underbrace{\frac{CL_I}{CL_H}}_{SIR_{DL}} - \frac{1}{N_r}$$

$$= \gamma * SIR_{DL} - \frac{1}{N_r}$$

In the case of home cell MU and virtual cell MU, the SE gain corresponds to two users and is modeled as:

$$SE_{Gain} = 2 * \log\left(\frac{1 + \frac{N_r * (PSD_{TX} + \Delta PSD)}{CL_H * NI_{H,Ant}}}{1 + \frac{N_r * PSD_{TX,Ant}}{CL_H * NI_{H,Ant}}}\right)$$

$$= \log\left(1 + \frac{\frac{N_r * \Delta PSD}{CL_H}}{NI_{H,Ant} + \frac{N_r * PSD_{TX,Ant}}{CL_H}}\right)^2 \approx$$

$$\log\left(1 + \frac{2 * \frac{N_r * \Delta PSD}{CL_H}}{NI_{H,Ant} + \frac{N_r * PSD_{TX,Ant}}{CL_H}}\right)$$

Because MU-MIMO is used in the home cell, the interference power to the virtual cell is doubled. Accordingly, the SE loss also doubled:

$$SE_{Loss}^I = 2 * \log\left(\frac{1 + \frac{N_r * SNR_{I,Ant} * P_{Noise,Ant}}{NI_{I,Ant}}}{1 + \frac{N_r * SNR_{I,Ant} * P_{Noise,Ant}}{NI_{I,Ant} + 2 * \Delta PSD / CL_I}}\right)$$

$$= \log\left(\frac{1 + \frac{N_r * SNR_{I,Ant} * P_{Noise,Ant}}{NI_{I,Ant}}}{1 + \frac{N_r * SNR_{I,Ant} * P_{Noise,Ant}}{NI_{I,Ant} + 2 * \Delta PSD / CL_I}}\right)^2 \approx$$

$$\log\left(1 + \frac{2 * \frac{2 * \Delta PSD}{CL_I * NI_{I,Ant}}}{1 + \frac{N_r * SNR_{I,Ant} * P_{Noise,Ant}}{NI_{I,Ant} + 2 * \Delta PSD / CL_I}} \cdot \frac{N_r * SNR_{I,Ant} * P_{Noise,Ant}}{NI_{I,Ant} + 2 * \Delta PSD / CL_I}\right)$$

Therefore, the optimal Tx power spectral density leads to signal to interference and noise ratio of equation (b):

$$\Delta SE = SE_{Gain} - SE_{Loss}^I = 0(\Delta PSD \to 0)$$

$$\Rightarrow \frac{2 * \frac{N_r * \Delta PSD}{CL_H}}{NI_{H,Ant} + \frac{N_r * PSD_{TX,Ant}}{CL_H}} =$$

$$\frac{2 * \frac{2 * \Delta PSD}{CL_I * NI_{I,Ant}}}{1 + \frac{N_r * SNR_{I,Ant} * P_{Noise,Ant}}{NI_{I,Ant} + 2 * \Delta PSD / CL_I}} \cdot \frac{N_r * SNR_{I,Ant} * P_{Noise,Ant}}{NI_{I,Ant} + 2 * \Delta PSD / CL_I}$$

$$\Rightarrow \frac{1}{NI_{H,Ant} + \frac{N_r * PSD_{TX,Ant}}{CL_H}} = \frac{2 * CL_H / CL_I}{1 + N_r * SINR_{I,Ant}} \cdot \frac{SINR_{I,Ant}}{NI_{I,Ant}}$$

$$\Rightarrow PSD_{TX,Ant} = \frac{1}{N_r} * \left\{ \frac{CL_I * NI_{I,Ant} * (1 + N_r * SINR_{I,Ant})}{2 * SINR_{I,Ant}} - NI_{H,Ant} * CL_H \right\}$$

$$\Rightarrow SINR_{H,Ant} = \underbrace{\frac{1}{2} * \frac{NI_{I,Ant}}{NI_{H,Ant}} * \left(1 + \frac{1}{N_r * SINR_{I,Ant}}\right)}_{\gamma} * \underbrace{\frac{CL_I}{CL_H}}_{SIR_{DL}} - \frac{1}{N_r}$$

$$= \gamma * SIR_{DL} - \frac{1}{N_r}$$

Evaluation of various embodiments of uplink power control techniques using simulation results are described next. The simulation setting is listed in Table 1:

TABLE 1

Uplink System Level Simulation (SLS) Setting

| Parameter | Value |
|---|---|
| Carrier frequency (GHz) | 2.5 GHz |
| System bandwidth | 10 MHz |
| Reuse factor | 1 |
| Frame duration (Preamble + DL + UL) | 5 ms |
| Number of OFDMA symbols in the UL sub frame | 6 |
| FFT size (tone) | 1024 |
| Useful tones | 864 |
| Number of Logical Resource Units (LRUs) | 48 |
| LRU type | CRU |
| Number of users per sector | 10 |
| MU-MIMO support | no |
| BS-to-BS distance | 500 m |
| Channel model | eITU-Ped B, 3 km/h |
| Max power in MS (dBm) | 23 dBm |
| Antenna Configuration | 1x2 SIMO |
| HARQ | Synchronous, non-adaptive HARQ with maximum retransmission number equal to 4 |
| Target PER | 20% |
| Link to system mapping | RBIR |
| Scheduler type | Proportional fair scheduler |
| Resource Assignment Block Size | 4 LRUs |
| Penetration loss (dB) | 20 dB |
| Control Overhead | 25% |

Table 2 summarizes simulation results based on the settings of Table 1.

TABLE 2

Simulation Results

| Gamma value | Sector throughout (in Mbps) | Cell-edge user throughput (in Kbps) | Sector SE | Cell-Edge user SE |
|---|---|---|---|---|
| 0.2 | 1.3865 | 104 | 0.8146 | 0.0611 |
| 0.4 | 1.5655 | 95.6 | 0.9198 | 0.0562 |
| 0.6 | 1.7056 | 77.2 | 1.002 | 0.0454 |
| 0.8 | 1.7895 | 58.8 | 1.0514 | 0.0345 |
| 1.0 | 1.8619 | 41.2 | 1.0939 | 0.0242 |

Figure 6:
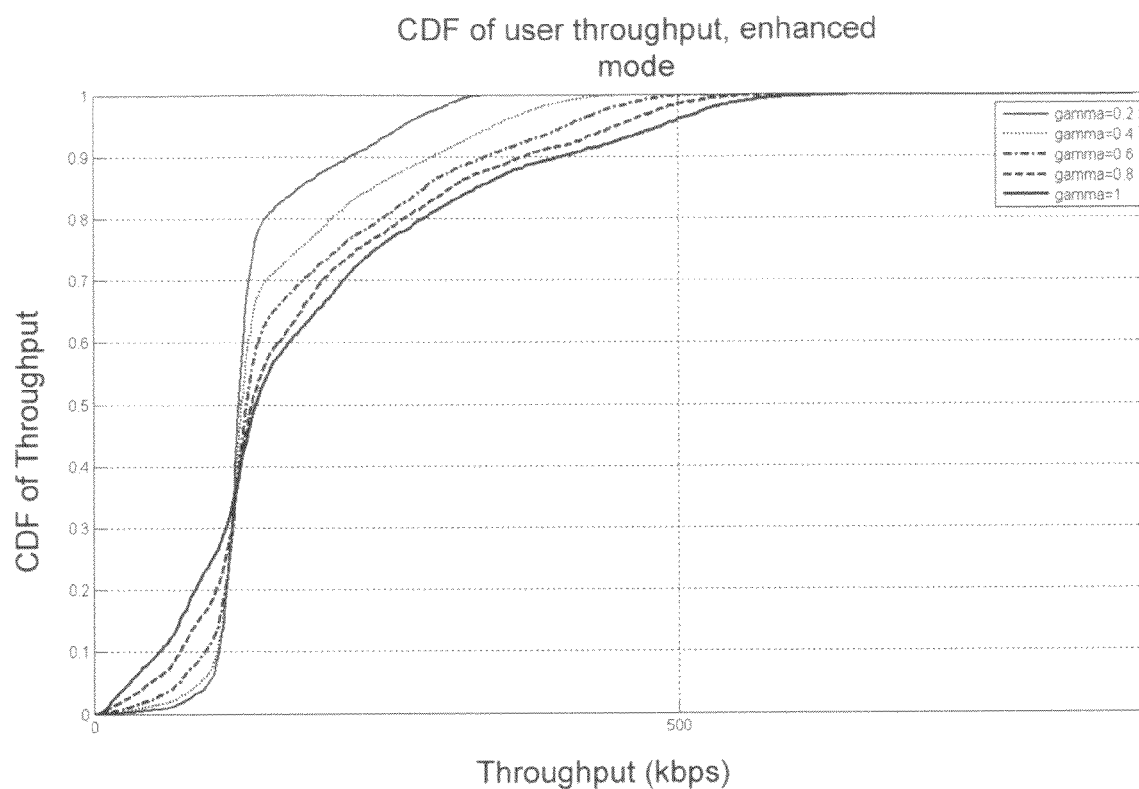
FIG. 6 depicts a cumulative density function (CDF) of user throughput.
Figure 7A:
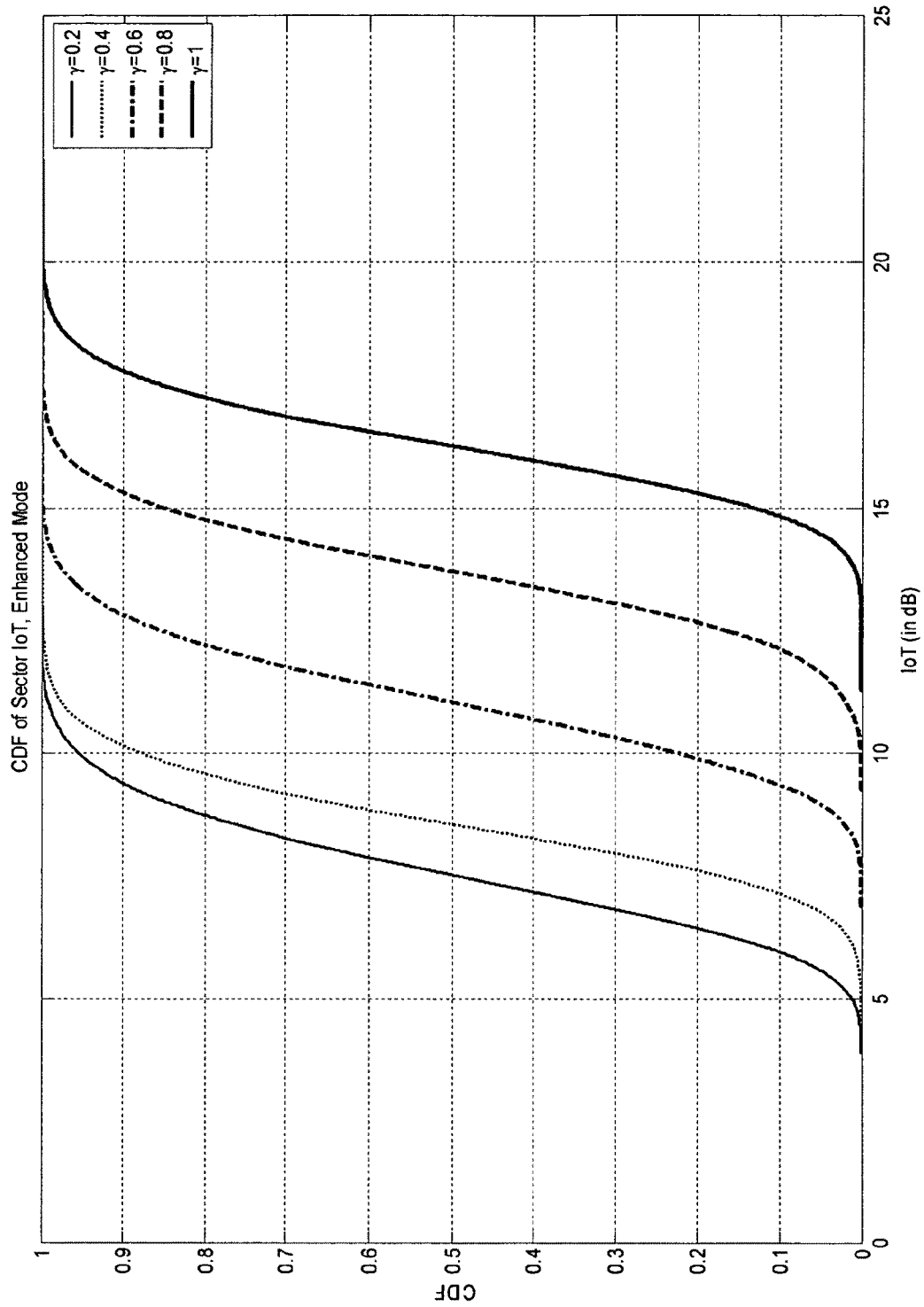
FIG. 7A depicts a performance curve for some simulation results.
Figure 7B:
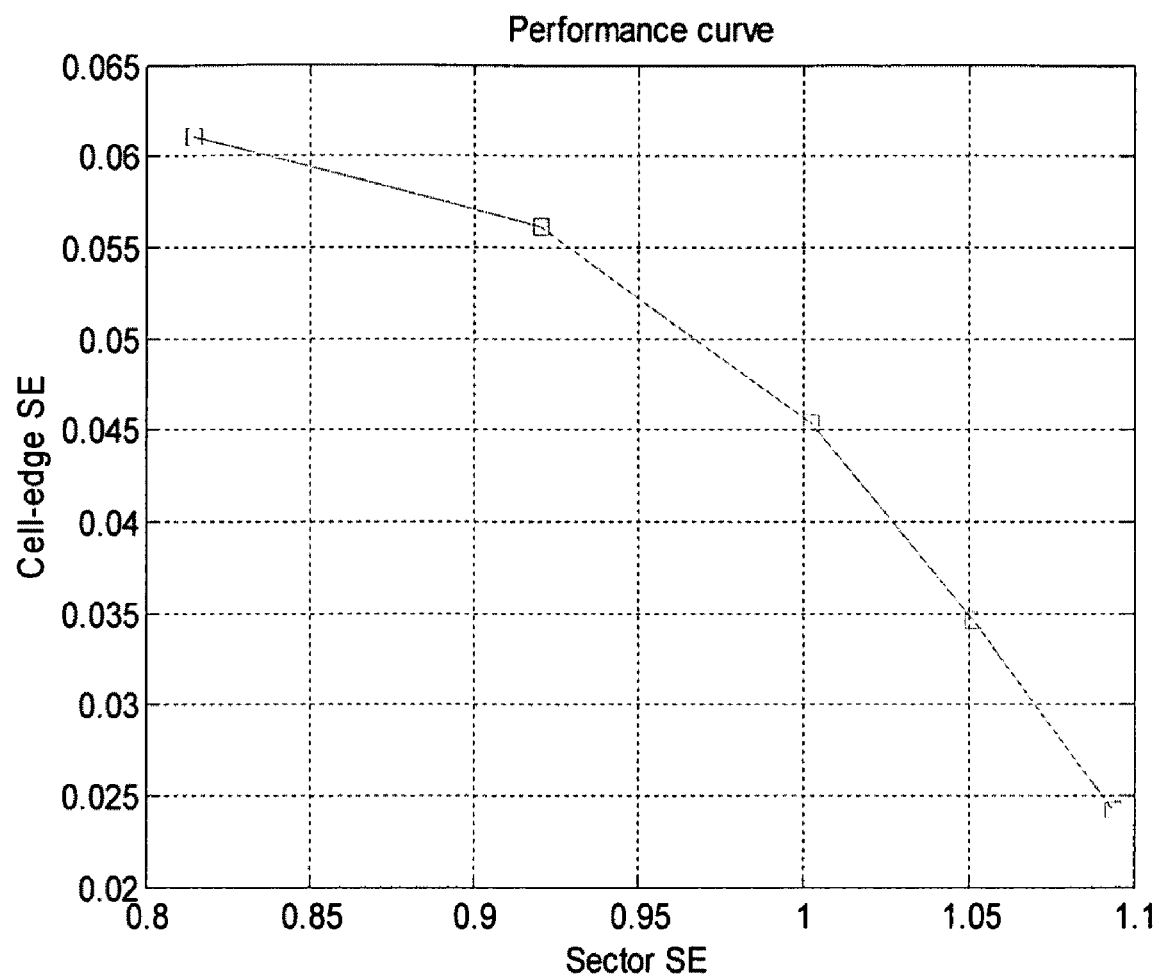
FIG. 7B depicts an interference over thermal control curve for some simulation results.

FIG. 6 depicts a cumulative density function (CDF) of user throughput. FIGS. 7A and 7B depict performance curve and interference over thermal control curve for some simulation results for the simulation results of Table 2.

Based on the presented simulation results, various embodiments provide benefit for the uplink of: (1) interference control and (2) tradeoff between of overall system throughput and cell edge performance.

It is noted that the power control scheme of various embodiments can meet the 802.16m requirements for the cell-edge user performance without appreciable degradation of the average spectral efficiency.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   receiving, at a serving base station, noise plus interference level information (NI) from at least one neighboring base station;
   receiving, at the serving base station, a request from a mobile station for identification of a calculation formula for determining a target signal to interference and noise ratio ($SINR_{Target}$);
   determining, by the serving base station, a control factor, the control factor including identification of the calculation formula for determining $SINR_{Target}$, a signal to interference and noise ratio (SINR) requirement for the minimum data rate expected by the base station ($SINR_{MIN}$), and the NI;
   transmitting, by the serving base station, the control factor to the mobile station; and
   receiving, at the serving base station, a signal from at least one antenna of the mobile station, an uplink transmit power of the signal from the at least one antenna calculated by the mobile station using the identified calculation formula for determining $SINR_{Target}$, the $SINR_{MIN}$ and the NI provided by the control factor sent to the mobile station by the serving base station.

2. The method of claim 1, wherein the uplink transmit power per antenna is based on:

$$P(dBm) = L + SINR_{Target} + NI, \text{ where}$$

L comprises the estimated average uplink propagation loss.

3. The method of claim 2, wherein:
the $SINR_{Target}$ is based at least in part on:

$$SINR_{Target} = 10\log10\left(\max\left(10 \wedge \left(\frac{SINR_{MIN}}{10}\right), \gamma \times SINR_{DL} - \frac{1}{N_r}\right)\right),$$

where
γ represents a fairness and interference over thermal (IoT) control factor,
$SINR_{DL}$ comprises a ratio of useful downlink signal to downlink interference power measured at the mobile station, and
$N_r$ comprises the number of receive antennas at the base station in communication with the mobile station.

4. The method of claim 3, wherein:
the IoT control factor is based at least in-part on uplink interference level of neighboring base stations.

5. The method of claim 1, wherein the uplink transmit power per antenna is based on:

$P$(dBm)=$L$+$SINR_{Target}$+NI+Offset_AMS$_{perAMS}$+ Offset_ABS$_{perAMS}$, where
L comprises an estimated average current uplink propagation loss,
Offset_AMS$_{perAMS}$ comprises a correction term for Adaptive MIMO Switching (AMS)-specific power offset, and
Offset_ABS$_{perAMS}$ comprises a correction term for AMS-specific power offset.

6. The method of claim 5, wherein:
the $SINR_{Target}$ is based at least in part on:

$$SINR_{target} = \begin{cases} C/N - 10\log10(R), & \text{mode1} \\ SINR_{OPT}, & \text{mode2}, \end{cases}$$

where
C/N comprises a normalized carrier-to-noise ratio of a modulation/FEC rate for a current transmission,
R comprises a number of repetitions for the modulation/FEC rate, and
$SINR_{OPT}$ comprises a target SINR value for interference over thermal control;
wherein the control factor identifies mode 1 or mode 2 for use in calculating the $SINR_{Target}$.

7. A base station comprising:
logic to receive noise plus interference level information (NI) from at least one neighboring base station;
logic to receive a request from a mobile station for identification of a calculation formula for determining a target signal to interference and noise ratio ($SINR_{Target}$);
logic to determine a control factor, the control factor including identification of the calculation formula for determining $SINR_{Target}$, a signal to interference and noise ratio (SINR) requirement for the minimum data rate expected by the base station $SINR_{MIN}$), and the NI;
logic to transmit the control factor to the mobile station; and
logic to receive a signal from at least one antenna of the mobile station, an uplink transmit power of the signal from the at least one antenna calculated by the mobile station using the identified calculation formula for determining $SINR_{Target}$, the $SINR_{MIN}$ and the NI provided by the control factor sent to the mobile station.

8. The base station of claim 7, wherein the uplink transmit power level is to determine:

$P$(dBm)=$L$+$SINR_{Target}$+NI, where

L comprises the estimated average uplink propagation loss.

9. The base station of claim 7, wherein the uplink transmit power per antenna is based on:

$P$(dBm)=$L$+$SINR_{Target}$+NI+Offset_AMS$_{perAMS}$+ Offset_ABS$_{perAMS}$, where
L comprises an estimated average current uplink propagation loss,
Offset_AMS$_{perAMS}$ comprises a correction term for Adaptive MIMO Switching (AMS)-specific power offset, and
Offset_ABS$_{perAMS}$ comprises a correction term for AMS-specific power offset.

10. A system comprising:
at least one antenna,
a computer system communicatively coupled to the at least one antenna, the computer system comprising:
logic to determine a transmit power for at least one antenna, wherein the logic to determine the transmit power comprises logic to send a request to a serving base station for identification of a calculation formula for determining a target signal to interference and noise ratio ($SINR_{Target}$) and logic to receive a control factor from the serving base station the control factor including identification of the calculation formula for determining $SINR_{Target}$, a signal to interference and noise ratio (SINR) requirement for the minimum data rate expected by the base station $SINR_{MIN}$), and noise plus interference level information (NI) obtained from at least one neighboring base station and
logic to transmit a signal from at least one antenna based on the determined transmit power, wherein the logic to determine the transmit power:
further includes logic to calculate an uplink transmit power from the at least one antenna using the identified calculation formula for determining $SINR_{Target}$, the $SINR_{MIN}$ and the NI provided by the control factor.

11. The system of claim 10, wherein the logic to determine a transmit power for at least one antenna is to determine:

$P$(dBm)=$L$+$SINR_{Target}$+NI, where

L comprises path loss.

12. The system of claim 10, wherein the logic to determine a transmit power for at least one antenna is to determine:

$P$(dBm)=$L$+$SINR_{Target}$+NI+Offset_AMS$_{perAMS}$+ Offset_ABS$_{perAMS}$, where
L comprises path loss,
Offset_AMS$_{perAMS}$ comprises a correction term for Adaptive MIMO Switching (AMS)-specific power offset, and
Offset_ABS$_{perAMS}$ comprises a correction term for AMS-specific power offset.

* * * * *

UNITED STATES PATENT AND TRADEMARK OFFICE
CERTIFICATE OF CORRECTION

| | |
|---|---|
| PATENT NO. | : 8,340,593 B2 |
| APPLICATION NO. | : 12/590546 |
| DATED | : December 25, 2012 |
| INVENTOR(S) | : Yang et al. |

It is certified that error appears in the above-identified patent and that said Letters Patent is hereby corrected as shown below:

On the Title Page, Item (56)

On page 2, in column 1, under "Other Publications", line 10, delete "C80216m" and insert --C802.16m--, therefor On page 2, in column 1, under "Other Publications", line 14, delete "et al. ," and insert --et al.,--, therefor On page 2, in column 1, under "Other Publications", line 16, delete "802.16m",IEEE" and insert --802.16m", IEEE--, therefor On page 2, in column 1, under "Other Publications", line 22-23, after "802.16m",", delete "IEEE C802.16m-08/682r2,", therefor On page 2, in column 1, under "Other Publications", line 24, after "Group,", insert --IEEE C802.16m-08/682r2,--, therefor On page 2, in column 2, under "Other Publications", line 8, after "et al.", insert --,--, therefor On page 2, in column 2, under "Other Publications", line 13, delete "C80216m" and insert --C802.16m--, therefor On page 2, in column 2, under "Other Publications", line 24, after "15.3.9.4", insert --,--, therefor In the Claims In column 15, line 57, in Claim 7, before "$SINR_{MIN}$),", insert --(--, therefor Signed and Sealed this
Second Day of December, 2014

Michelle K. Lee
*Deputy Director of the United States Patent and Trademark Office*

CERTIFICATE OF CORRECTION (continued)
U.S. Pat. No. 8,340,593 B2

In column 16, line 31, in Claim 10, after "station", insert --,--, therefor

In column 16, line 35, in Claim 10, before "$SINR_{MIN}$),", insert --(--, therefor In column 16, line 37, in Claim 10, after "station", insert --;--, therefor In column 16, line 40, in Claim 10, delete "power: ¶" and insert --power further--, therefor